United States Patent
Roberts et al.

(10) Patent No.: US 9,878,789 B2
(45) Date of Patent: Jan. 30, 2018

(54) LIFT AND HOLD DIFFERENTIAL LIFT PDU UTILIZING A PERMANENT MAGNET ROTOR

(71) Applicant: GOODRICH CORPORATION, Charlotte, NC (US)

(72) Inventors: Aaron Roberts, Jamestown, ND (US); Scott Harms, Ypsilanti, ND (US); Wesley K. Stegmiller, Jamestown, ND (US); Dustin P. Scheer, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 253 days.

(21) Appl. No.: 14/937,562

(22) Filed: Nov. 10, 2015

(65) Prior Publication Data

US 2017/0129606 A1 May 11, 2017

(51) Int. Cl.
| | |
|---|---|
| *H02K 1/27* | (2006.01) |
| *B64D 9/00* | (2006.01) |
| *B65G 13/06* | (2006.01) |
| *F16H 37/12* | (2006.01) |
| *H02K 7/116* | (2006.01) |
| *H02K 11/21* | (2016.01) |

(52) U.S. Cl.
CPC .............. *B64D 9/00* (2013.01); *B65G 13/065* (2013.01); *F16H 37/124* (2013.01); *H02K 1/27* (2013.01); *H02K 7/116* (2013.01); *H02K 11/21* (2016.01); *B64D 2009/006* (2013.01)

(58) Field of Classification Search
CPC ...................................................... H02K 1/27

USPC .............................................. 318/727, 3, 34
See application file for complete search history.

(56) References Cited

U.S. PATENT DOCUMENTS

| 4,746,843 A * | 5/1988 | Taenzer .................... H02P 6/06 |
| | | 318/400.2 |
| 5,131,527 A | 7/1992 | Huber |
| 5,547,069 A | 8/1996 | Pritchard |
| 5,661,384 A * | 8/1997 | Glibbery .............. H02H 7/0852 |
| | | 160/309 |
| 5,716,028 A | 2/1998 | Evans et al. |
| 6,420,846 B1 * | 7/2002 | Wolfe ...................... B64D 9/00 |
| | | 198/780 |
| 7,199,543 B1 * | 4/2007 | Hettwer .................. B64D 9/00 |
| | | 198/781.01 |
| 2007/0057120 A1 | 3/2007 | McConnell |
| 2009/0284089 A1 | 11/2009 | Wingett et al. |

OTHER PUBLICATIONS

Extended European Search Report dated Apr. 5, 2017 in European Application No. 16197692.3.

* cited by examiner

*Primary Examiner* — David S Luo

(57) ABSTRACT

A power drive unit (PDU) for moving cargo relative to a cargo bay of an aircraft includes a cam shaft. The PDU also includes a lift cam coupled to the cam shaft and configured to cause the PDU to be in at least one of a raised position or a lowered position based on rotation of the cam shaft. The PDU also includes a permanent magnet motor configured to generate a cogging torque sufficient to resist rotation of the cam shaft such that the PDU remains in the raised position in response to power being removed from the permanent magnet motor.

17 Claims, 4 Drawing Sheets

LIFT AND HOLD DIFFERENTIAL LIFT PDU UTILIZING A PERMANENT MAGNET ROTOR

FIELD

The present disclosure is directed to power drive units for use in cargo bays of aircraft and, more particularly, to power drive units designed to have sufficient cogging torque to cause the power drive units to remain in a raised position when power is removed.

BACKGROUND

Many aircraft are designed to transport cargo instead of, or in addition to, passengers. The cargo is stored in unit load devices (ULDs) within a cargo bay of the aircraft. The ULDs are typically filled with cargo outside of the aircraft, moved into the cargo bay and then moved to a desired position within the cargo bay for storage during transport. The ULDs are supported in the interior cargo bay by a plurality of rollers providing a low friction transport plane which is commonly referred to as a conveyor plane. The cargo bay can include many power drive units (PDUs) that each have one or more tires for interfacing with and transporting the cargo laterally (i.e., in a direction parallel to the wingspan of the aircraft) or longitudinally forward and aft. The cargo bay also has two separate areas in relation to ULD motion. One area laterally aligned with the cargo door has an omni-directional function to allow for lateral and longitudinal translation. The area of the cargo system either forward or aft of the cargo door only requires longitudinal translation. Thus, traditional aircraft include interior PDUs that only move the cargo forward and aft and orthogonally oriented PDUs laterally aligned with the door to the cargo bay that can move cargo laterally and forward/aft. In order to change the direction of cargo movement, one set of parallel oriented PDUs can be lowered below the conveyor plane, and then the orthogonally oriented PDUs adjacent to them can be raised above the conveyor plane.

Traditional PDUs utilize an induction motor to rotate the tire as well as to raise and lower the PDU relative to the conveyor plane. In response to power being removed from the PDU, the motor of the PDU generates no torque and is lowered below the conveyor plane. In response to the PDU being lowered, any cargo above the PDU can move relative to the conveyor plane as the conveyor plane may provide relatively little friction. This is undesirable as unsecured cargo can become damaged, can damage other cargo and/or can change the weight distribution of the aircraft.

SUMMARY

Described herein is a power drive unit (PDU) for moving cargo relative to a cargo bay of an aircraft. The PDU includes a cam shaft. The PDU also includes a lift cam coupled to the cam shaft and configured to cause the PDU to be in at least one of a raised position or a lowered position based on rotation of the cam shaft. The PDU also includes a permanent magnet motor configured to generate a cogging torque sufficient to resist rotation of the cam shaft such that the PDU remains in the raised position in response to power being removed from the permanent magnet motor.

In any of the foregoing PDUs, the permanent magnet motor includes at least one of an interior permanent magnet motor, a surface permanent magnet motor or a brushless direct current (DC) motor.

In any of the foregoing PDUs, the permanent magnet motor is configured to generate about 18 ounce-inches of cogging torque.

Any of the foregoing PDUs may also include a planetary gear set configured to be coupled to the permanent magnet motor and to the cam shaft such that mechanical power can transfer from the permanent magnet motor to the cam shaft via the planetary gear set and such that a gear ratio of the planetary gear set multiplies the cogging torque of the permanent magnet motor to generate reflected inertia.

Any of the foregoing PDUs may also include an output shaft coupled to the permanent magnet motor and to the planetary gear set such that mechanical power can transfer from the permanent magnet motor to the output shaft via the planetary gear set.

Any of the foregoing PDUs may also include a drag clutch coupled to the planetary gear set and configured to control the coupling between the cam shaft and the planetary gear set and between the output shaft and the planetary gear set.

Any of the foregoing PDUs may also include a controller coupled to the permanent magnet motor and configured to control rotation of a rotor of the permanent magnet motor.

In any of the foregoing PDUs, an entire gear set of the PDU has a gear ratio between 60 to 1 (60:1) and 85:1.

Any of the foregoing PDUs may also include a rotary encoder and wherein the permanent magnet motor includes a rotor and a stator and the rotary encoder is configured to detect an angular position of the rotor relative to the stator.

Any of the foregoing PDUs may also include a controller configured to determine an angular position of the PDU relative to the conveyor plane based on data detected by the rotary encoder.

Any of the foregoing PDUs may also include an optional encoder configured to detect an angular position of the cam shaft relative to the conveyor plane.

Also described is an aircraft cargo system. The aircraft cargo system includes a cargo bay. The aircraft cargo system also includes a power drive unit (PDU) for moving cargo. The PDU includes a cam shaft. The PDU also includes a lift cam coupled to the cam shaft and configured to cause the PDU to be in at least one of a raised position or a lowered position based on rotation of the cam shaft. The PDU also includes a permanent magnet motor configured to generate a cogging torque sufficient to resist rotation of the cam shaft.

In any of the foregoing aircraft cargo systems, the PDU further includes a planetary gear set configured to be coupled to the permanent magnet motor and to the cam shaft such that mechanical power can transfer from the permanent magnet motor to the cam shaft via the planetary gear set and such that a gear ratio of the planetary gear set multiplies the cogging torque of the permanent magnet motor to generate reflected inertia.

In any of the foregoing aircraft cargo systems, the PDU further includes an output shaft coupled to the permanent magnet motor and to the planetary gear set such that mechanical power can transfer from the permanent magnet motor to the output shaft via the planetary gear set.

In any of the foregoing aircraft cargo systems, the PDU further includes a drag clutch coupled to the planetary gear set and configured to control the coupling between the cam shaft and the planetary gear set and between the output shaft and the planetary gear set.

In any of the foregoing aircraft cargo systems, the PDU further includes a controller coupled to the permanent magnet motor and configured to control rotation of a rotor of the permanent magnet motor.

In any of the foregoing aircraft cargo systems, the PDU further includes a rotary encoder and wherein the permanent magnet motor includes a rotor and a stator and the rotary encoder is configured to detect an angular position of the rotor relative to the stator.

In any of the foregoing aircraft cargo systems, the PDU further includes a controller configured to determine an angular position of the PDU relative to the conveyor plane based on data detected by the rotary encoder.

In any of the foregoing aircraft cargo systems, the PDU further includes an optional encoder configured to detect an angular position of the cam shaft relative to the conveyor plane.

Also described is a method for controlling operation of a power drive unit (PDU) of an aircraft. The method includes receiving, by a controller, a request for the PDU to be in a raised position or in a lowered position. The method also includes receiving, by the controller, data corresponding to a current angular position of the PDU relative to a conveyor plane. The method also includes controlling, by the controller, a motor such that the PDU is in the raised position or the lowered position based on the data corresponding to the current angular position of the PDU.

In any of the foregoing methods, the motor is a permanent magnet motor configured to generate a cogging torque sufficient to cause the PDU to remain in the raised position in response to power being removed from the permanent magnet motor.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
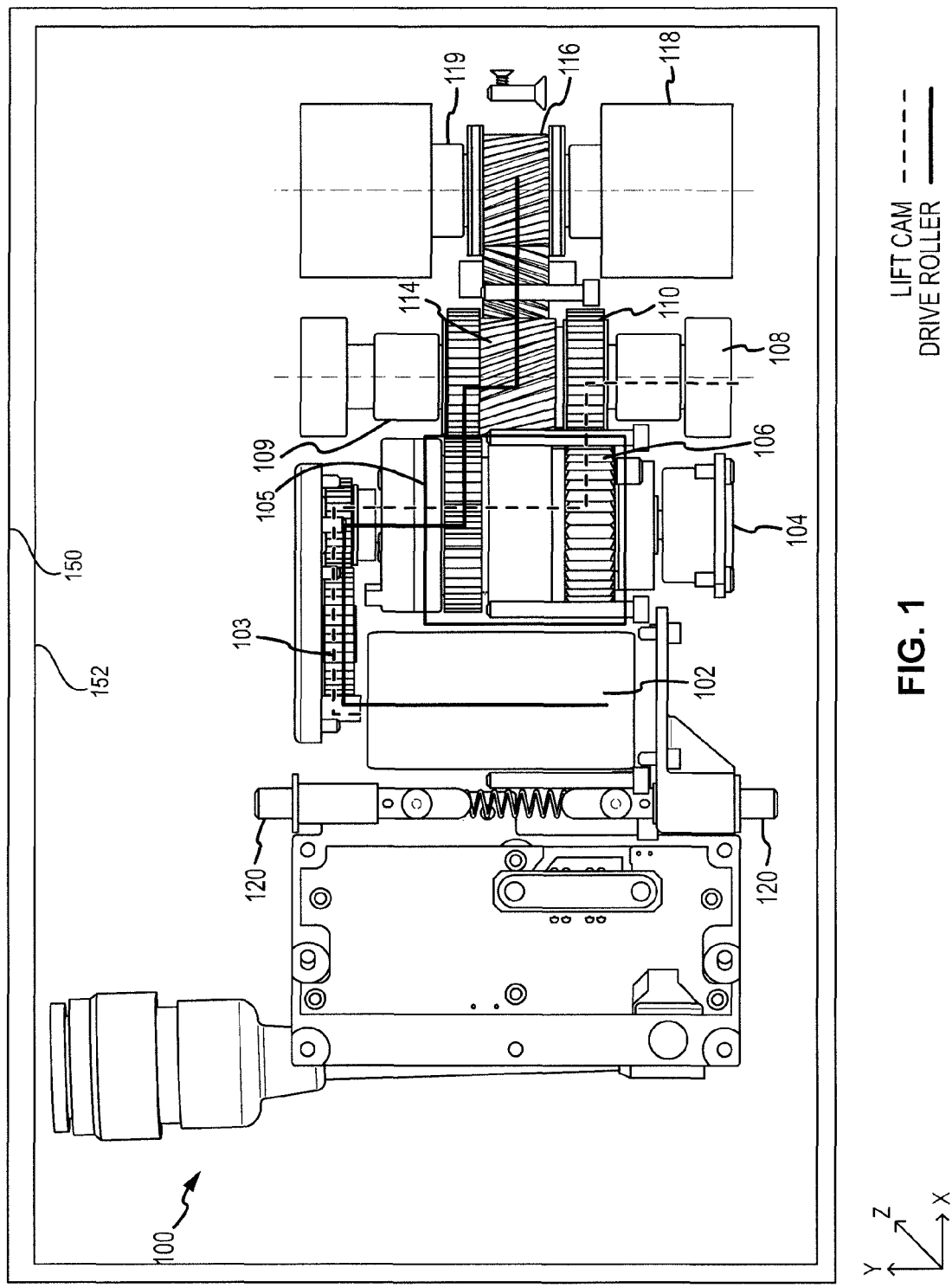
FIG. 1 is a drawing of a power drive unit (PDU), in accordance with various embodiments.

Turning now to FIG. 1, a power drive unit (PDU) 100 is shown in a lowered configuration. An X-Y-Z axis is shown throughout the drawings to illustrate the relative position of components. The PDU 100 can be used in a cargo bay 152 of an aircraft 150 for moving one or more unit load device (ULD) relative to the cargo bay 152. A ULD can include any cargo unit to be stored in the cargo bay 152 during flight.

The PDU 100 can include one or more tires 118 that rotate, causing movement of the ULD in a particular direction. The PDU 100 may be positioned adjacent to an entrance of the cargo bay 152, and in that regard, the PDU 100 may be designed to move a ULD along the X axis and along the Y axis. Stated differently, the PDU 100 may be designed to move the ULD forward/aft and laterally relative to the aircraft 150. In order to accomplish both of these movements, the PDU 100 can be controlled to lower itself below the conveyor plane and then to have an orthogonally-oriented PDU raise itself above the conveyor plane. For example, the PDU 100 may be raised above the conveyor plane to transport a ULD along the Y axis, such as from a door of a cargo bay into the cargo bay. After the ULD is in the cargo bay, the PDU 100 can lower itself below the conveyor plane, while an adjacent PDU raises itself above the conveyor plane for transporting the ULD along the X axis.

The PDU 100 can include a motor 102. The motor 102 can convert electrical power into mechanical power.

When it is desirable for the PDU 100 to raise above the conveyor plane, the motor 102 can generate mechanical power that is transferred through a first stage gear 103 into a planetary gear set 105. A drag clutch 104 is coupled to the planetary gear set 105 and controls the operation of the planetary gear set 105. Stated differently, the drag clutch 104 controls the distribution of mechanical power to components of the PDU 100.

As the motor 102 begins to rotate in the forward direction, the power is transferred through the planetary gear set 105 to a ring gear 110 and to a carrier gear 114. A cam shaft 109 rotates in response to rotation of the ring gear 110. In response to rotation of the cam shaft 109, a lift cam 108 is actuated, causing the PDU 100 to rotate about a pin 120 towards the positive Z direction (i.e., the PDU 100 rotates in the forward direction). After a predetermined amount of rotation, the lift cam 108 reaches a physical stop which restricts further rotation of the lift cam 108. When the lift cam reaches this physical stop, the PDU 100 is in a raised position such that the tire 118 of the PDU 100 is above the conveyor plane.

While the lift cam 108 is actuating the PDU 100 to the raised position, power from the motor 102 may also be transferred to a drive gear 116 via the carrier gear 114. Rotation of the drive gear 116 causes rotation of the output shaft 119. The output shaft 119 is coupled to the tire 118 that rotates along with the output shaft 119. In order to move a ULD, the ULD is positioned on the tire 118. Friction between the tire 118 and the ULD causes the ULD to move in a predetermined direction in response to rotation of the tire 118. When the lift cam 108 reaches the physical stop in the raised position and can no longer rotate the PDU, the output shaft 119 continues to receive mechanical power to drive the tire 118.

When it is desirable for the PDU 100 to lower below the conveyor plane, the motor 102 can rotate in the reverse direction, causing the cam shaft 109 to rotate in the reverse direction. This causes the PDU 100 to become lowered below the conveyor plane. The position at the lowered state is determined by the input of the rotary encoder to the controller and rotating the rotor a specific amount of rotations which is based on the gear ratio of the gear set, or by input of the optional encoder detecting the position of the cam shaft.

Figure 2:
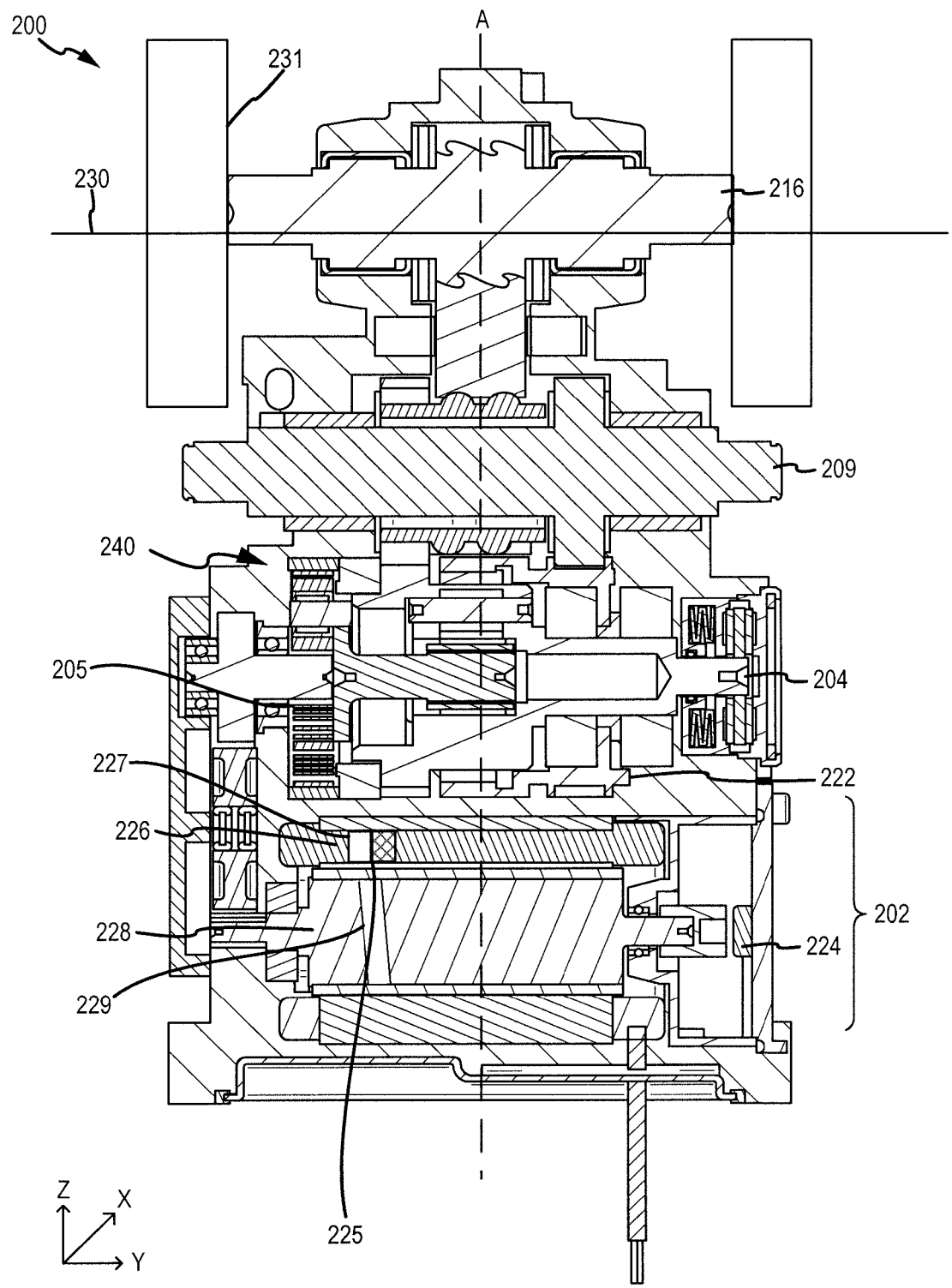
FIG. 2 is a drawing of a PDU having a motor designed to produce cogging torque and a planetary gear set that, together with the cogging torque of the motor, cause the PDU to remain in a raised position when power is removed, in accordance with various embodiments.

Referring now to FIG. 2, a PDU 200 is designed to have the ability to remain in the raised position in response to electrical power being removed from the PDU 200. The PDU 200 is shown to be in the raised position (i.e., rotated 90 degrees about the Y axis relative to the PDU 100). The permanent magnet motor 202 can include any type of permanent magnet motor such as an interior permanent magnet motor (IPM), a surface permanent magnet motor (SPM), a brushless direct current (DC) motor or any other similar type of motor that provides cogging torque.

The permanent magnet motor 202 can include a rotor 228 configured to rotate about an axis A. The permanent magnet motor 202 can also include a stator 226 configured to remain stationary relative to the axis A. Permanent magnets 229 may be embedded within the rotor 228 and may create a constant magnetic field. Windings 227 connected to an AC power supply may be positioned within the stator 226. The windings 227 may receive AC power and may generate a magnetic field in response, such that the magnetic field changes as the phase of the power changes. This rotating magnetic field may attract and/or repel the permanent magnets 229 of the rotor 228, causing the rotor 228 to rotate about the axis A. The angular velocity of the rotor 228, the amount of torque applied to the rotor 228 and the direction of rotation of the rotor 228 can be adjusted by controlling the amplitude, frequency and phase of the power signal.

Because the permanent magnets 229 are not dependent upon current, they continue to generate a magnetic field in response to power being removed from the permanent magnet motor 202. In this state, the magnetic field of the permanent magnets 229 can attract and/or repel metallic portions 225 of the stator 226. This stationary force (due to this attraction/repulsion) resists rotation of the rotor 228 relative to the axis A. This force may be referred to as a cogging torque. The permanent magnet motor 202 is designed to have sufficient cogging torque to ensure that the PDU 200 remains in the raised position in response to power being removed from the PDU 200.

The rotor 228 may be coupled to a planetary gear set 205. The planetary gear set 205 may be coupled to a cam shaft 209 via a drag clutch 204 and may also be coupled to an output shaft 216 via the drag clutch 204. The drag clutch 204 may be used to control the couplings of the planetary gear set 205 to operatively couple the rotor 228 to a cam shaft 209 and/or to operatively couple the rotor 228 to the output shaft 216.

The output shaft 216 may be coupled to a tire 231. When the PDU 200 is in the raised position (as shown in FIG. 2), the tire 231 may extend beyond the conveyor plane 230 in the positive Z direction. In response to rotation of the rotor 228 when the rotor 228 is operatively coupled to the output shaft 216, the output shaft 216 may rotate, resulting in rotation of the tire 231. This rotation of the tire may cause a ULD that is in contact with the tire 231 to move relative to the PDU 200. When configured as shown in FIG. 2, the PDU 200 will drive the ULD along the X axis.

The cam shaft 209 may rotate in response to forward rotation of the rotor 228 when the rotor 228 is coupled to the cam shaft 209, causing a lift cam to rotate the PDU 200 into the raised position.

In response to power being removed from the permanent magnet motor 202, a downward force exerted on the PDU 200 (such as from a ULD) can be translated via the planetary gear set 205 to the rotor 228. The entire gear set 240 of the PDU 200, including the planetary gear set 205, can have a 60 to 1 (60:1) to 85:1 gear ratio. This downward force can cause reverse rotation of an induction motor and may be sufficient to overcome the cogging torque of the permanent magnet motor 202 alone. However, the cogging torque of the permanent magnet motor 202 is multiplied by the gear ratio of the planetary gear set 205, resulting in sufficient reflected inertia to resist this reverse rotation of the rotor 228. This reflected inertia is sufficient to cause the PDU 200 to remain in the raised position even when the power is removed from the PDU 200.

When it is desirable for the PDU 200 to be in the lowered position, power may be applied to the windings 227 in such a way as to create a magnetic field that will cause the rotor 228 to rotate in the reverse direction. In response to this reverse rotation of the rotor 228 when the planetary gear set 205 is coupled to the cam shaft 209, the cam shaft 209 will rotate in the reverse direction, causing the PDU 200 to actuate towards the lowered position.

The PDU 200 may include one or more sensors or encoders, such as a rotary encoder 224 configured to determine the angular position of the rotor 228 relative to the stator 226 and/or an optional encoder 222 configured to determine the angular position of the cam shaft 209 relative to the conveyor plane 230. The angular position of the rotor 228 relative to the stator 226 can be used by a controller, such as a controller 300 of FIG. 3, to determine the angular position of the cam shaft 209 (and, thus, the PDU 200) relative to the conveyor plane 230. Based on this information, the controller can determine whether the PDU 200 is in the raised position, the lowered position or a position in between.

If higher resolution is desired, the optional encoder 222 can detect the angular position of the cam shaft 209 relative to the conveyor plane 230. Using the determined or detected position of the cam shaft 209 relative to the conveyor plane 230, the controller can properly control the cam shaft 209 to cause the PDU 200 to be in the raised or the lowered position, as desired.

Figure 3:
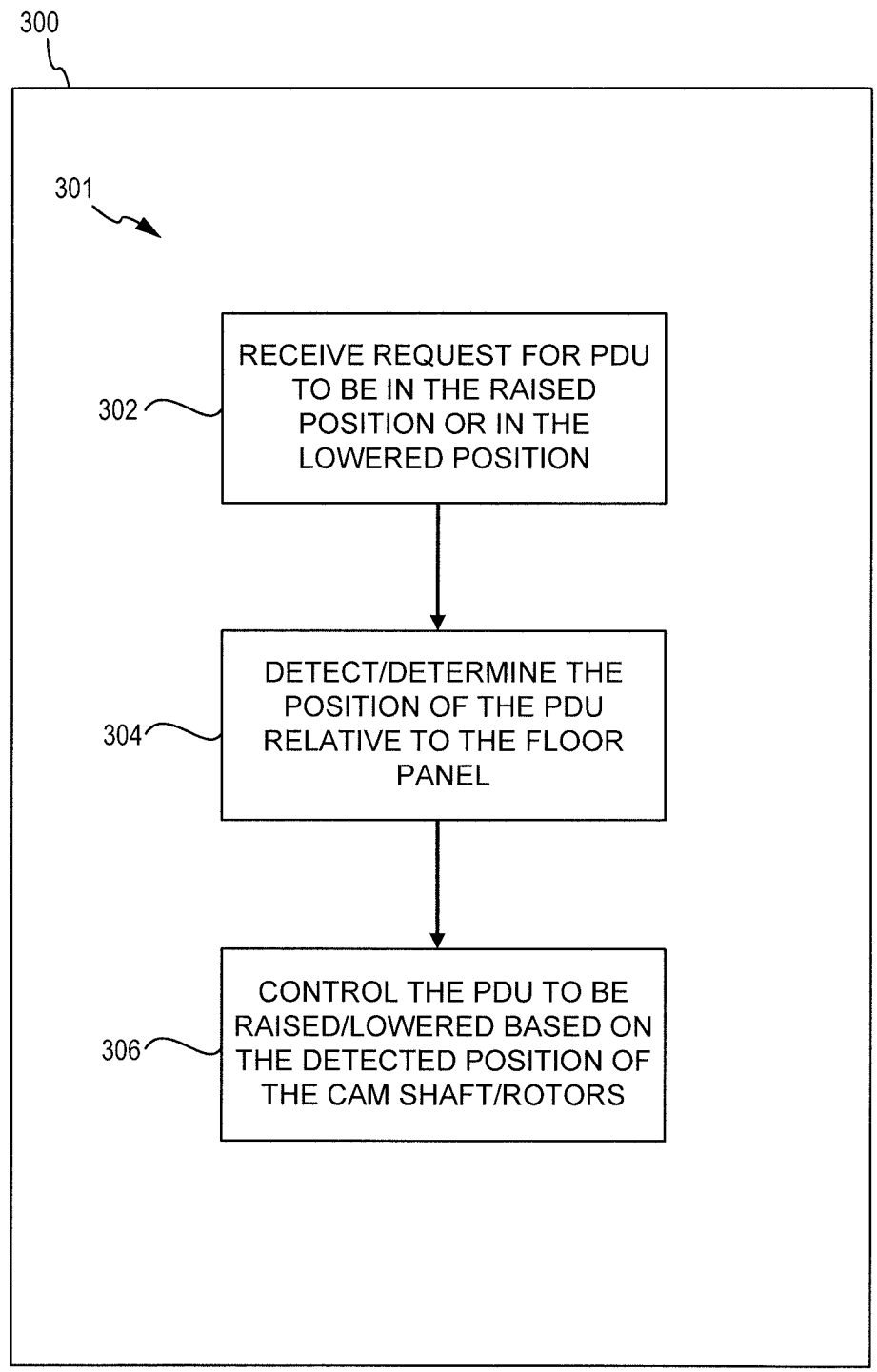
FIG. 3 is a drawing of a controller of the PDU of FIG. 2 and further illustrates a method that can be performed by the controller, in accordance with various embodiments.

Referring now to FIGS. 2 and 3, the controller 300 may be adapted to perform a method 301 for controlling the angular position of the cam shaft and, thus, for controlling the angular position of the PDU 200 relative to the conveyor plane 230. In block 302, the controller 300 may receive a request for the PDU 200 to be in the raised position or the lowered position. For example, the request may be received from a user interface operatively coupled to the controller 300.

In block 304, the controller can receive the angular position of the rotor 228 relative to the stator 226 and/or the position of the cam shaft 209 relative to the conveyor plane 230. Based on this information, the controller 300 can determine a current angular position of the PDU 200 relative to the conveyor plane 230 and, thus, whether the PDU 200 is in the raised position, the lowered position or in between.

In block 306, the controller 300 can control the PDU 200 based on the detected or determined angular position of the PDU 200 relative to the conveyor plane 230. For example, the controller 300 can cause the rotor 228 to be operatively coupled to the cam shaft 209 and can control the power applied to the windings 227 of the stator 226 to control the position of the PDU 200 relative to the conveyor plane 230.

Figure 4:
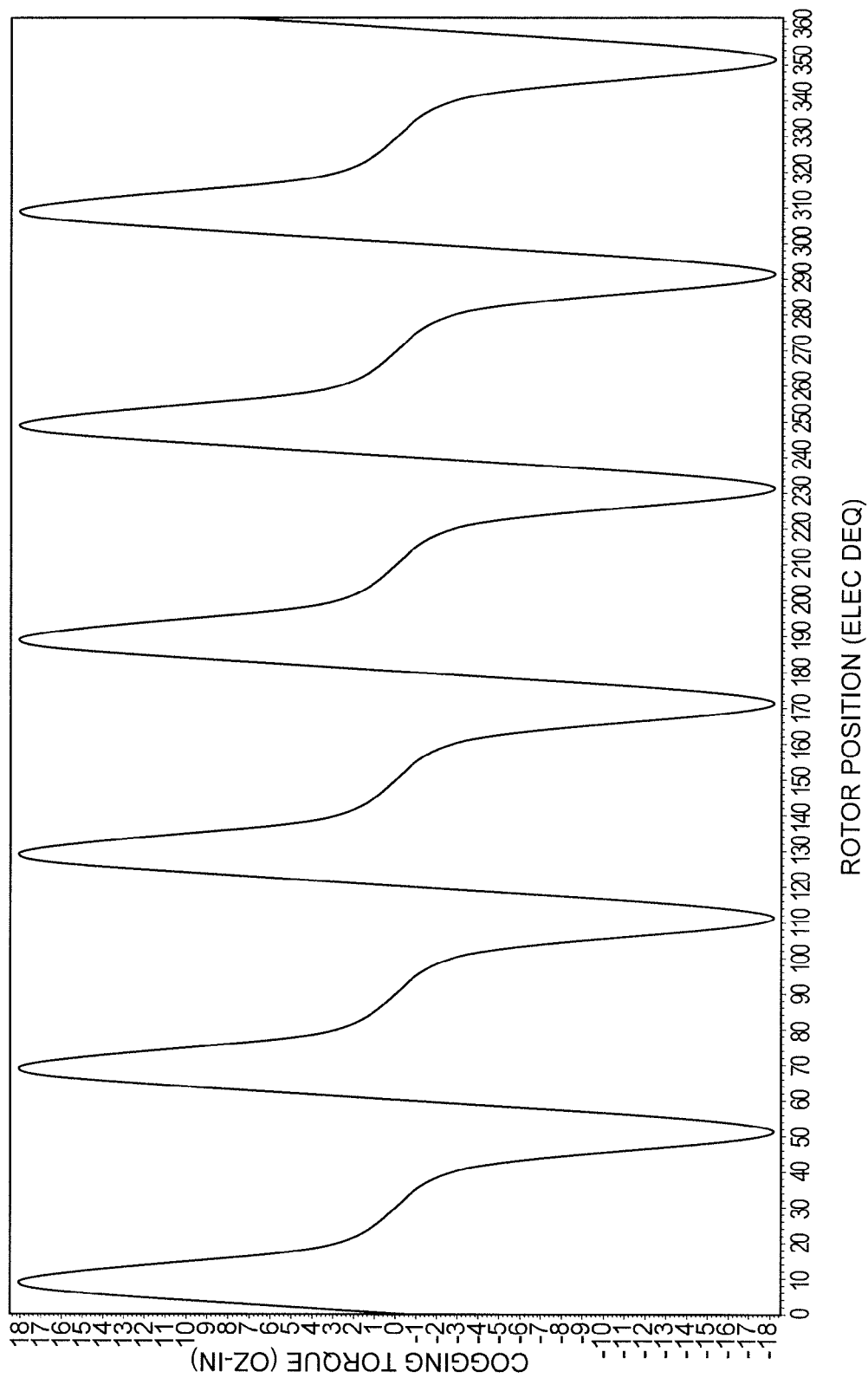
FIG. 4 is a drawing illustrating results of a model of the motor of FIG. 2, in accordance with various embodiments.

Referring now to FIGS. 2 and 4, results of a simulation of the permanent magnet motor 202 of the PDU 200 are shown. The permanent magnet motor can be a 4 pole, 12 slot surface permanent magnet motor. FIG. 4 illustrates the cogging torque of the permanent magnet motor 202 based on the rotational position of the rotor 228. As shown, the cogging torque can range between negative 18 ounce-inches (~18 oz-in, ~1.30 kilogram-centimeters (kg-cm)) and 18 oz-in (1.30 kg-cm) based on the angular position of the rotor 228 relative to the stator 226. 18 oz-in is approximately 20 percent (20%) of the torque available when the permanent magnet motor 202 is excited and is sufficient to cause the PDU 200 to remain in the raised position in response to removal of power.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power drive unit (PDU) for moving cargo relative to a cargo bay of an aircraft, comprising:
   a cam shaft;
   a lift cam coupled to the cam shaft and configured to cause the PDU to be in at least one of a raised position or a lowered position based on rotation of the cam shaft;
   a permanent magnet motor configured to generate a cogging torque sufficient to resist rotation of the cam shaft such that the PDU remains in the raised position in response to power being removed from the permanent magnet motor; and
   a planetary gear set configured to be coupled to the permanent magnet motor and to the cam shaft such that mechanical power can transfer from the permanent magnet motor to the cam shaft via the planetary gear set and such that a gear ratio of the planetary gear set multiplies the cogging torque of the permanent magnet motor to generate reflected inertia.

2. The PDU of claim 1, wherein the permanent magnet motor includes at least one of an interior permanent magnet motor, a surface permanent magnet motor or a brushless direct current (DC) motor.

3. The PDU of claim 1, wherein the permanent magnet motor is configured to generate about 18 ounce-inches of cogging torque.

4. The PDU of claim 1, further comprising an output shaft coupled to the permanent magnet motor and to the planetary gear set such that mechanical power can transfer from the permanent magnet motor to the output shaft via the planetary gear set.

5. The PDU of claim 4, further comprising a drag clutch coupled to the planetary gear set and configured to control the coupling between the cam shaft and the planetary gear set and between the output shaft and the planetary gear set.

6. The PDU of claim 5, further comprising a controller coupled to the permanent magnet motor and configured to control rotation of a rotor of the permanent magnet motor.

7. The PDU of claim 1, wherein an entire gear set of the PDU has a gear ratio between 60 to 1 (60:1) and 85:1.

8. The PDU of claim 7, further comprising a controller configured to determine an angular position of the PDU relative to a conveyor plane based on data detected by the rotary encoder.

9. The PDU of claim 1, further comprising a rotary encoder and wherein the permanent magnet motor includes a rotor and a stator and the rotary encoder is configured to detect an angular position of the rotor relative to the stator.

10. A power drive unit (PDU) for moving cargo relative to a cargo bay of an aircraft, comprising:
    a cam shaft;
    a lift cam coupled to the cam shaft and configured to cause the PDU to be in at least one of a raised position or a lowered position based on rotation of the cam shaft;

a permanent magnet motor configured to generate a cogging torque sufficient to resist rotation of the cam shaft such that the PDU remains in the raised position in response to power being removed from the permanent magnet motor, the permanent magnet motor including a rotor and a stator;

a rotary encoder configured to detect an angular position of the rotor relative to the stator; and a controller configured to determine an angular position of the PDU relative to a conveyor plane based on data detected by the rotary encoder.

11. The PDU of claim 10 further comprising a planetary gear set configured to be coupled to the permanent magnet motor and to the cam shaft such that mechanical power can transfer from the permanent magnet motor to the cam shaft via the planetary gear set and such that a gear ratio of the planetary gear set multiplies the cogging torque of the permanent magnet motor to generate reflected inertia.

12. The PDU of claim 11 further comprising an output shaft coupled to the permanent magnet motor and to the planetary gear set such that mechanical power can transfer from the permanent magnet motor to the output shaft via the planetary gear set.

13. The PDU of claim 12 further comprising a drag clutch coupled to the planetary gear set and configured to control the coupling between the cam shaft and the planetary gear set and between the output shaft and the planetary gear set.

14. The PDU of claim 10 wherein the controller is coupled to the permanent magnet motor and configured to control rotation of a rotor of the permanent magnet motor.

15. The PDU of claim 10 further comprising an optional encoder configured to detect an angular position of the cam shaft relative to the conveyor plane.

16. A method for controlling operation of a power drive unit (PDU) of an aircraft, comprising
receiving, by a controller, a request for the PDU to be in a raised position or in a lowered position;
detecting, by a rotary encoder, an angular position of a rotor of a permanent magnet motor of the PDU relative to a stator of the permanent magnet motor;
determining, by the controller, a current angular position of the PDU relative to a conveyor plane based on the detected current angular position of the rotor relative to the stator; and
controlling, by the controller, the permanent magnet motor such that the PDU is in the raised position or the lowered position based on the determined current angular position of the PDU.

17. The method of claim 16, wherein the permanent magnet motor is configured to generate a cogging torque sufficient to cause the PDU to remain in the raised position in response to power being removed from the permanent magnet motor.

* * * * *